(12) United States Patent
Zimoto et al.

(10) Patent No.: US 9,459,973 B2
(45) Date of Patent: Oct. 4, 2016

(54) STORAGE SUBSYSTEM, AND METHOD FOR VERIFYING STORAGE AREA

(71) Applicant: HITACHI, LTD., Tokyo (JP)

(72) Inventors: Yosihumi Zimoto, Tokyo (JP); Mao Ohara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 321 days.

(21) Appl. No.: 14/237,066

(22) PCT Filed: Mar. 22, 2013

(86) PCT No.: PCT/JP2013/058292
§ 371 (c)(1),
(2) Date: Feb. 4, 2014

(87) PCT Pub. No.: WO2014/147816
PCT Pub. Date: Sep. 25, 2014

(65) Prior Publication Data
US 2015/0378855 A1 Dec. 31, 2015

(51) Int. Cl.
*G06F 11/20* (2006.01)
*G06F 11/00* (2006.01)
*G06F 3/06* (2006.01)

(52) U.S. Cl.
CPC ......... *G06F 11/2069* (2013.01); *G06F 3/0619* (2013.01); *G06F 3/0647* (2013.01); *G06F 3/0688* (2013.01); *G06F 11/008* (2013.01); *G06F 2201/85* (2013.01)

(58) Field of Classification Search
USPC .............................................. 714/6.13, 4.11
See application file for complete search history.

(56) References Cited

U.S. PATENT DOCUMENTS

| 8,429,346 B1* | 4/2013 | Chen ................. G06F 3/0689 709/213 |
| 9,003,157 B1* | 4/2015 | Marshak ............ G06F 3/0685 711/170 |
| 2005/0004682 A1* | 1/2005 | Gaddis ................ A01D 91/00 700/9 |
| 2007/0050670 A1 | 3/2007 | Shigemura et al. |
| 2007/0061513 A1 | 3/2007 | Tsumagari et al. |
| 2008/0201542 A1* | 8/2008 | Maruyama ........... G06F 3/0607 711/165 |
| 2011/0161406 A1* | 6/2011 | Kakeda ............... G06F 3/0604 709/203 |
| 2011/0185020 A1* | 7/2011 | Ramamurthy ....... H04L 67/306 709/204 |
| 2011/0197027 A1* | 8/2011 | Balasubramanian ... G06F 3/061 711/117 |
| 2011/0289287 A1* | 11/2011 | Yamamoto ........... G06F 3/0605 711/156 |

(Continued)

FOREIGN PATENT DOCUMENTS

JP 2007-65788 A 3/2007
JP 2007-72988 A 3/2007

(Continued)

*Primary Examiner* — Kamini Patel
(74) *Attorney, Agent, or Firm* — Mattingly & Malur, PC

(57) ABSTRACT

There is provided a method for verifying a full drive as an error check processing of a storage drive, but along with the increase in capacity of the storage drive, there are cases where error check cannot be executed before using the storage area. In the present invention, quantity of use of data is estimated, and the storage areas corresponding to the estimated quantity are verified periodically. By verifying the storage area to be used in advance before actual data use, the occurrence of error can be prevented without having to execute a check of the full drive.

9 Claims, 7 Drawing Sheets

(56) References Cited

U.S. PATENT DOCUMENTS

| | | | |
|---|---|---|---|
| 2011/0320754 A1* | 12/2011 | Ichikawa | G06F 3/0605 711/165 |
| 2012/0317358 A1 | 12/2012 | Ando et al. | |
| 2013/0046950 A1* | 2/2013 | Coronado | G06F 3/061 711/170 |
| 2013/0097377 A1* | 4/2013 | Satoyama | G06F 3/0605 711/114 |
| 2013/0151804 A1* | 6/2013 | Alatorre | G06F 17/30165 711/170 |
| 2013/0282983 A1* | 10/2013 | Mills | G06F 12/0811 711/122 |
| 2013/0297869 A1* | 11/2013 | Mills | G06F 3/0674 711/112 |
| 2013/0297872 A1* | 11/2013 | Hyde, II | G06F 3/0611 711/117 |
| 2015/0081964 A1* | 3/2015 | Kihara | G06F 3/0611 711/114 |
| 2015/0212756 A1* | 7/2015 | Coronado | G06F 3/0647 711/114 |
| 2015/0301743 A1* | 10/2015 | Nagao | G06F 11/34 711/113 |

FOREIGN PATENT DOCUMENTS

| | | |
|---|---|---|
| WO | 2012/029114 A1 | 3/2012 |
| WO | 2012/169027 A1 | 12/2012 |

* cited by examiner

Fig. 3

| Entry No. | Chunk No. | RG No. | Start LBA | Used Pages | Valid Flag | Virtual LUN | Virtual LBA | Read Accesses | Final Update Time |
|---|---|---|---|---|---|---|---|---|---|
| 1 | 00000000h | 0101h | 00000000h | 100h | Y | 0 | 00000000h | 26 | 2012/03/12 10:20:30 |
| 2 | 00000001h | 0102h | 00000000h | 100h | Y | 0 | 00000100h | 26 | 2012/03/12 10:20:30 |
| : | : | : | : | : | : | : | : | : | : |
| X-1 | 0001FFFFh | 0110h | 0001F00h | 100h | Y | 0 | 001FFF00h | 5 | 2012/03/12 10:20:32 |
| X | 00020000h | 0021h | 00002000h | 10h | N | 1 | 00000000h | 0 | 2012/03/13 11:22:33 |
| X+1 | 00020001h | 0021h | 00002100h | 100h | Y | 1 | 00000100h | 10 | 2012/06/12 15:26:37 |
| : | : | : | : | : | : | : | : | : | : |

Fig. 4

| Chunk No. | RG No. | Start LBA |
|---|---|---|
| 00000002h | 0101h | 00000100h |
| 00000003h | 0102h | 00000100h |
| : | : | : |
| 0000FFFFh | 0110h | 00000F00h |
| 00010000h | 0101h | 00001000h |
| 00010001h | 0102h | 00001000h |
| : | : | : |

STORAGE SUBSYSTEM, AND METHOD FOR VERIFYING STORAGE AREA

TECHNICAL FIELD

The present invention relates to a storage subsystem, and a method for verifying storage area.

BACKGROUND ART

Recently, along with the explosive increase of information and data handled in companies and government offices, the amount of data processed in large-scale computers such as host computers or storage subsystems coupled to servers and host computers or the capacity of data stored therein are increasing rapidly. Unlike information processing systems such as servers, storage subsystems are systems specialized for storing data, and a large number of hard disks which are data storage media having high reliability and large capacity are used, which are managed and operated via a RAID (Redundant Array of Independent (Inexpensive) Disks) method.

Further, the reduction of costs of storage subsystems is advancing recently, and along therewith, the hard disk drives (hereinafter referred to as HDDs) used in the subsystem are exchanged from the expensive and highly reliable fiber channel (hereinafter referred to as FC) type to inexpensive SAS (Serial Attached SCSI) type, and further, a SATA (Serial ATA) type drive which is even more inexpensive than the SAS are becoming more and more popular.

However, since the SAS disks and SATA disks are inexpensive, they have lower reliability than FC disks. Therefore, the simple replacement of HDDs in the storage subsystem from the FC disks to SAS disks or SATA disks will deteriorate the reliability of the whole storage subsystem.

Moreover, the recent advancement of the high recording density technique has led to the increased capacity of HDDs. Therefore, there is fear that the frequencies of occurrence of non-recoverable or recoverable errors caused by physical defects such as flaws (defects formed during fabrication or cuts caused by head contact) on the media which is the recording section of the HDD or data read failures caused by insufficient recording are increased. Therefore, in order to prevent the loss of data caused by defects and the like, as shown in patent literature 1, verification processing (CRC (Cyclic Redundancy Check) during verification operation and the like) on the whole storage area within the HDD to detect defective portions and defective areas or data restoration such as replacement processing for replacing the defective areas are executed during operation of the storage subsystem.

The storage subsystem executes verification concurrently while processing data access requests from the host computers. Such verification is called online verification, which is executed asynchronously as the aforementioned data access processing. As a prior art technique regarding online verification, patent literature 1 discloses performing online verification processing via different cycles on the system area and the data area.

CITATION LIST

Patent Literature

PTL 1

United States Patent Application Publication No. 2007/0050670

SUMMARY OF INVENTION

Technical Problem

On the other hand, capacity of drives such as HDDs is growing steadily. In a prior art storage subsystem, confirmation of reading of data of the full drive is executed in the background as error check operation (media check) of storage media in storage devices. Actually, the LBA (Logical Block Address) of HDD is subjected to read confirmation processing performed to several MBs (megabytes) once every few seconds from address 0 to the final LBA, and when read confirmation of the last LBA is completed, recheck is executed from the LBA of address 0.

Full surface scan processing of a storage device having a small storage capacity of smaller than 1 TB (terabyte) can be completed in a few days. However, approximately a month or longer is required to complete full surface scan processing of a storage device having a storage capacity of 4 TB to 6 TB. Further, the number of devices capable of being mounted on the storage subsystem is increasing, and under such circumstances, it is difficult to improve the reliability of media according to prior art methods.

If an error is discovered during use of data, it is necessary to perform reassignment of LBA or correction copy processing from other storage devices, which causes operation delay of the storage subsystem, and even further, if error occurs to multiple storage devices at the same time, user data may be lost in the worst case.

Solution to Problem

In order to solve the above problem, according to the present invention, the amount of data stored in the storage area to be used next is estimated and calculated. In a storage subsystem implementing storage tier control, migration quantity from an upper tier, migration quantity from a lower tier and data write quantity to each tier are estimated, according to which the amount of data use of each tier can be estimated and calculated. Then, verification processing is executed to a storage area having the estimated and calculated data use quantity, prior to use of the storage area such as storing of data thereto.

Advantageous Effects of Invention

According to the storage subsystem of the present invention, online verification processing is executed to the next storage area used for storing user data, and the reliability of the storage area can be improved. Problems, configurations and effects other than those described above will be made clear in the following description of embodiments.

BRIEF DESCRIPTION OF DRAWINGS

FIG. 3 is a view showing a configuration example of a used chunk table.

FIG. 4 is a view showing a configuration example of an unused chunk queue table.

DESCRIPTION OF EMBODIMENTS

Figure 1:
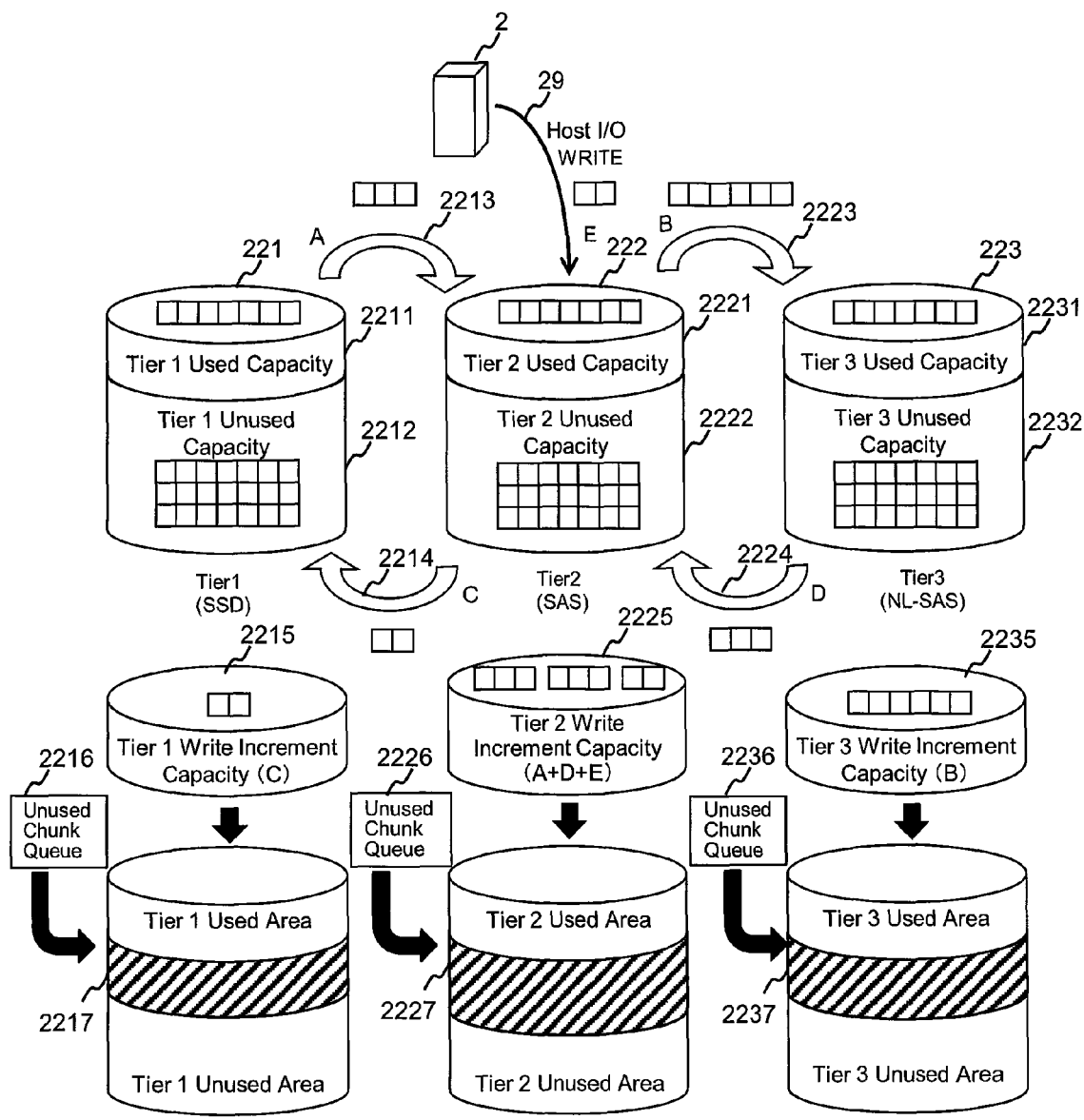
FIG. 1 is a view showing a concept of the present invention.

Now, the preferred embodiments of the present invention will be described with reference to the drawings. In the following description, various information are referred to as "tables" and the like, but the various information can also be expressed by data structures other than tables. Further, the "tables" can also be referred to as "information" to show that the information does not depend on the data structure.

The processes are sometimes described using the term "program" as the subject. The program is executed by a processor such as an MP (Micro Processor) or a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer program can be installed to each computer from a program source. The program source can be provided via a program distribution server or a storage media, for example.

Each element, such as each controller, can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical range of the present invention. The number of each component can be one or more than one unless defined otherwise.

A so-called storage tier control is performed in the current storage subsystem, which is a method for storing data having higher data access frequencies in higher-performance/expensive storage media (storage devices), such as an SSD, and storing data having lower data access frequencies in low-speed/inexpensive storage media, such as SATA and NL-SAS (Near-Line SAS). As described, in storage tier control of a storage subsystem where multiple varieties of storage devices are layered and handled, data will be used in various ways such as being written to respective tiers or migrated among tiers, so that it is necessary to prevent the occurrence of errors.

Through such storage tier control, all the storage areas of the storage devices within the storage subsystem will be used thoroughly, so that compared to storage devices of storage subsystems where tier control is not performed, the frequency of use of storage areas of the storage devices will be increased. As a result, the probability of a storage area being used without having an area including a media failure extracted in advance will be high. Therefore, the present invention computes the amount of data of the storage area considered to be used next. Then, the present invention periodically carries out a verification processing of the storage area having the calculated data use quantity, so as to maintain the reliability of the storage area.

<Concept of the Invention>

FIG. 1 is a view showing a concept of the present invention. The present view illustrates a model of inter-tier data migration for describing the concept of the present invention.

The storage capacity of Tier 1 (SSD) 221 is composed of a Tier 1 used capacity 2211 and a Tier 1 unused capacity 2212. Similarly, the storage capacity of Tier 2 (SAS) 222 is composed of a Tier 2 used capacity 2221 and a Tier 2 unused capacity 2222, and the storage capacity of Tier 3 (NL-SAS) 223 is composed of a Tier 3 used capacity 2231 and a Tier 3 unused capacity 2232.

In storage tier control, if the access frequency from host computer 2 to chunks divided into given data capacity sizes is below a lower limit threshold set for each tier, the data being stored is migrated to a lower tier. In contrast, if the access frequency is greater than an upper limit threshold, the data is migrated to an upper tier. For example, if a migration threshold (lower limit value of number of accesses within unit time) from Tier 3 to Tier 2 is ten times or greater, the chunk having a number of accesses of ten times or greater is migrated from Tier 3 to Tier 2. On the other hand, if the migration threshold value from Tier 1 to Tier 2 is smaller than 40 times, the chunk having the number of accesses of less than 40 times is migrated from Tier 1 to Tier 2.

Further, the data migration quantity among tiers (hereinafter referred to as migration quantity) is as follows:

(1a) Migration quantity A 2213: Migration from Tier 1 221 to Tier 2 222

(1b) Migration quantity B 2223: Migration from Tier 2 222 to Tier 3 223

(1c) Migration quantity C 2214: Migration from Tier 2 222 to Tier 1 221

(1d) Migration quantity D 2224: Migration from Tier 3 223 to Tier 2 222

(1e) Host I/O write data quantity (Tier 2) E 29: Data write from host computer 2 to Tier 2 222

The writing of host I/O data is not restricted to Tier 2, and can be performed to Tier 1 or to Tier 3.

The data write quantity of each tier during data migration is as follows:

(2a) Tier 1 write incremental quantity 2215: Migration quantity C (2b) Tier 2 write incremental quantity 2225: Migration quantity (A+D+E)

(2c) Tier 3 write incremental quantity 2235: Migration quantity B

For example, in FIG. 1, the increase or decrease of the data usage capacity of Tier 1 is the value obtained by subtracting migration quantity A 2213 from migration quantity C 2214. However, the freed area corresponding to migration quantity A 2213 which was originally a used area is added to the last of the unused chunk key (described later), so that the area corresponding to migration quantity C 2214 will be used newly.

In storage tier control, unused chunks of respective tiers are stored in a table for managing information related to the order of use of chunks as an unused chunk queue (unused chunk queue table), and based on the location information or the like of the chunk to be used next, it is possible to recognize in advance the LBA and the drive to be used next. Further, the chunk having been freed through migration of data among tiers and the like is listed on the last of the unused chunk queue.

Further, the information related to the chunk storing data (used chunk) is managed via a used chunk table (described later). Similarly, the information on a (unused) chunk having no data stored therein is managed via an unused chunk table, wherein the unused chunks are used from the top of the queue. The used chunks are deleted from the unused chunk queue table and stored in the used chunk table. The chunks stored in the used chunk table of each tier having data migrated to a different tier or having all the data stored therein deleted will be listed on the last of the unused chunk queue.

As described, the number of chunks corresponding to Tier 1 write increment capacity 2215, Tier 2 write increment capacity 2225 and Tier 3 write increment capacity 2235 of each tier can be computed by dividing the number of chunks by the chunk unit capacity of each tier. Then, the computed number of chunks is acquired from Tier 1 unused chunk queue 2216, Tier 2 unused chunk queue 2226 and Tier 3 unused chunk queue 2236.

Next, the chunks acquired from each tier are set as a next online verification target area (Tier 1) 2217, a next online verification target area (Tier 2) 2227, and a next online verification target area (Tier 3) 2237. Before the respective online verification target area is used, that is, before used data is stored therein, online verification processing is executed to extract defects and to restore the same.

As described, according to the present invention, online verification processing is executed in advance to the storage area set to store the user data next, so as to maintain and improve the reliability of data storage.

<Storage System>

Figure 2:
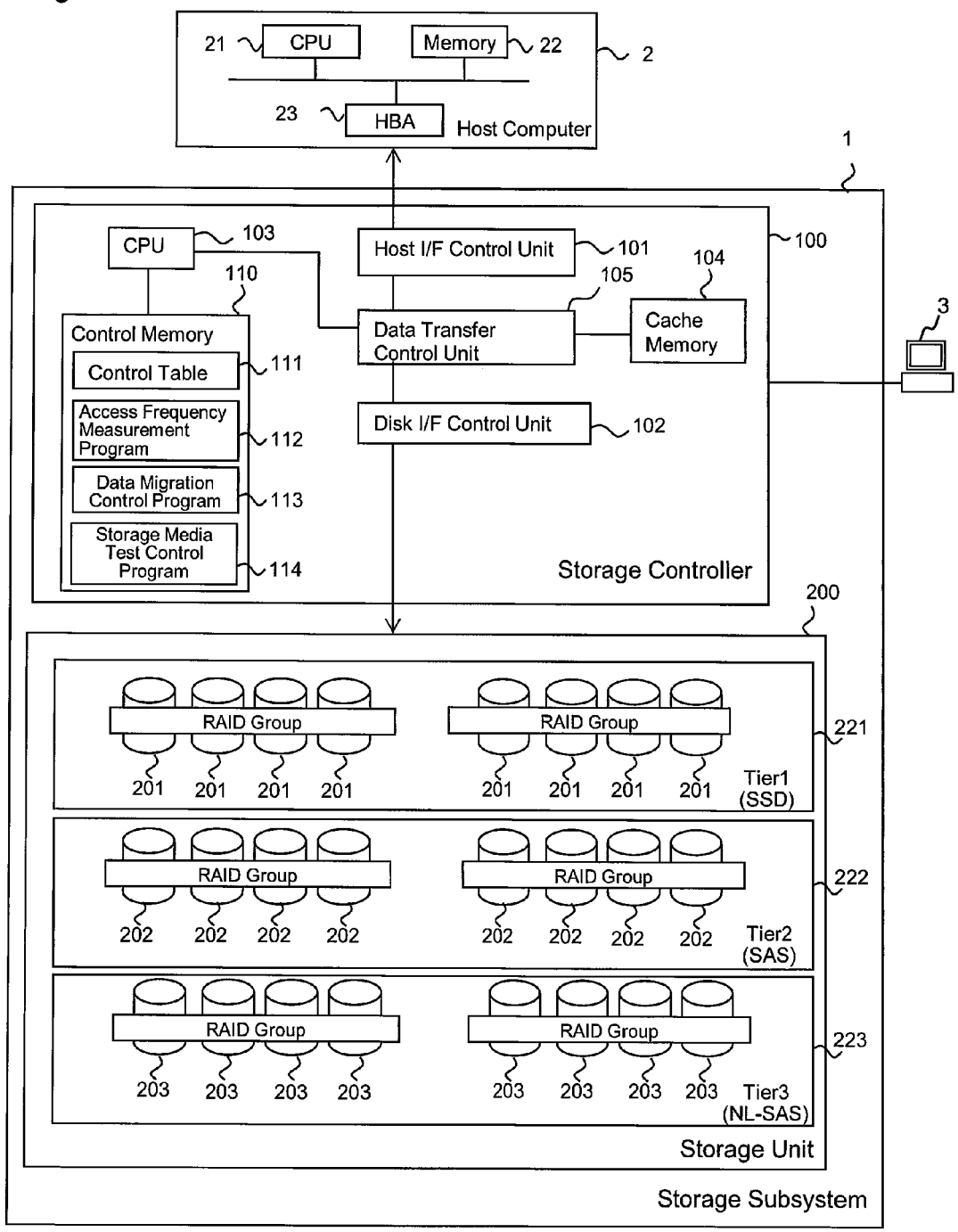
FIG. 2 is a block diagram of a storage system according to the present invention.

FIG. 2 is a block diagram of a storage system according to the present invention. A storage system comprises a storage subsystem 1 and a host computer 2.

The host computer 2 comprises a CPU 21 for controlling the whole computer, a memory 22 for storing control information and user data, and an HBA (Host Bus Adaptor) 23 for communicating with the storage subsystem 1. The host computer 2 sends and receives access commands and user data to/from the storage subsystem 1 via the HBA 23.

The storage subsystem 1 comprises a storage controller 100 and a storage unit 200. The storage controller 100 comprises a host I/F control unit 101, a disk I/F control unit 102, a CPU 103, a cache memory 104, a data transfer control unit 105, and a control memory 110. Further, a management terminal 3 is coupled to the storage subsystem 1. Although not shown, the management terminal 3 has, for example, a CPU, a memory, an output device displaying the status of operation of the storage subsystem 1 or the quantity of use of data in each tier, and an input device for receiving default values and thresholds mentioned later.

The host I/F control unit 101 is a controller for transmitting and receiving data to/from the host computer 2. The disk I/F control unit 102 is a controller for transmitting and receiving data to/from the storage device of the storage unit 200. The CPU 103 is a processor for controlling the whole storage subsystem 1. The cache memory 104 is a memory for temporarily storing user data from the host computer 2 and the storage unit 200 or the control information of the storage subsystem 1. The data transfer control unit 105 is a controller for transferring data or commands among the CPU 103, the respective control units and the respective memories.

The control memory 110 is for storing various tables and programs executed by the CPU 103, which includes, for example, a control table 111, an access frequency measurement program 112, a data migration control program 113, and a storage media test control program 114. The control table 111 includes tables such as a table for managing the positional information of the storage subsystem 1, a used chunk table or an unused chunk queue table described later.

The access frequency measurement program 112 is a program for measuring the access frequency of each chunk. The data migration control program 113 is a program for determining the tier level to be allocated based on the access frequency of each chunk, and migrating the data in the chunk to an allocation destination tier. The storage media test control program 114 is a program for executing an online verification processing and the like, which is a test performed to storage media in storage devices such as SSDs 201 and SAS drives 202.

The storage unit 200 includes pools respectively corresponding to Tier 1 (SSD) 221, Tier 2 (SAS) 222 and Tier 3 (NL-SAS) 223. Multiple SSDs 201 constitute a RAID group (hereinafter referred to as RG), and multiple RGs constitute the pool of Tier 1 (SSD) 221. Similarly, multiple SAS drives 202 constitute the pool of Tier 2 (SAS) 222, and multiple NL-SAS drives 203 constitute a pool of Tier 3 (NL-SAS) 223.

<Tables>

FIG. 3 is a view showing a configuration example of a used chunk table. The used chunk table 30 is a table for managing the information related to chunks storing data (used chunks).

The used chunk table 30 comprises an entry number 301 of used chunks, a chunk number 302 which is a serial number of the used chunks, an RG number 303 for uniquely identifying the RG to which it belongs, a start LBA 304 in the RG to which it belongs, a number of used pages 305 constituting the chunk, a valid flag 306 for determining whether the used chunk is valid or not, a virtual LUN 307 and a virtual LBA 308 for uniquely identifying the storage area provided to the host computer 2, number of read accesses 309 in each chunk, and a final update time 310.

FIG. 4 is a view showing a configuration example of an unused chunk queue table. The unused chunk queue table 40 is a table for managing the information related to the order of use of unused chunks in each tier as an unused chunk queue, which provides information on which LBA of which drive (which RG) will be used based on the location information and the like of the chunk to be used next.

The unused chunk queue table 40 includes a chunk number 401, an RG number 402, and a start LBA 403. For example, the unused chunk with a chunk number 401 of "00000002h" has an RG number 402 belong to RG "0101h", and the start LBA 403 thereof is "00000100h". Further, a chunk having been freed by data migration among tiers and the like is added to the last of the unused chunk queue.

The used chunk table 30 and the unused chunk queue table 40 are provided for each tier, for managing the used chunks and unused chunks for respective tiers.

<Determination Operation of Online Verification Target Area>

Figure 5:
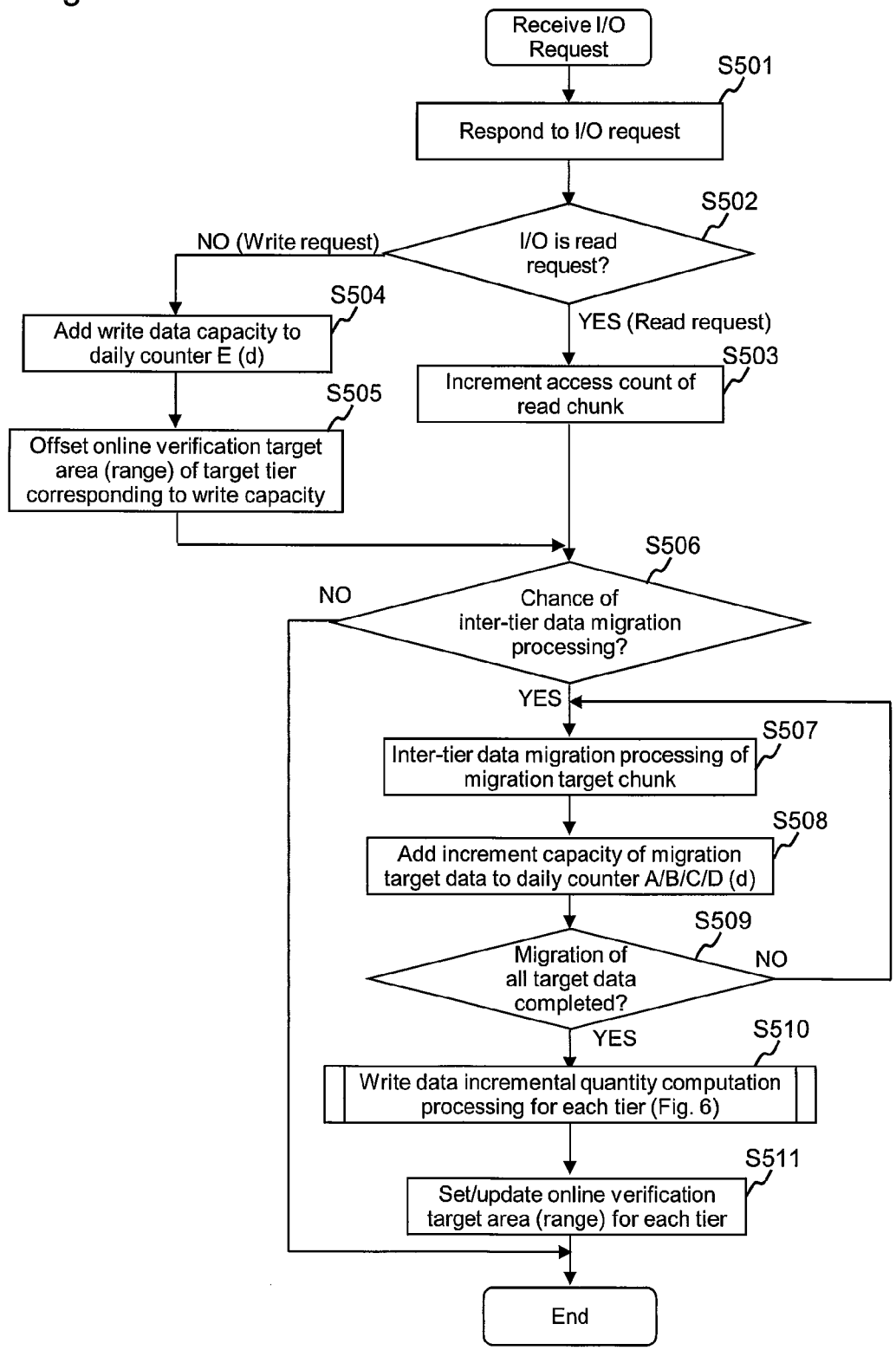
FIG. 5 is a flowchart showing a determination operation of an online verification target area for each tier.

FIG. 5 is a flowchart showing the operation for determining the online verification target area for each tier. The subject of the processing in the description is the CPU 103, but it can also be the program operating in the CPU 103 or the storage controller 100. The present processing is started when an I/O request is issued from the host computer 2 to the storage subsystem 1.

In S501, the CPU 103 receives the I/O request from the host computer 2 via the data transfer control unit 105 by the host I/F control unit 101. In S502, the CPU 103 determines whether the I/O request is a read request or not. If the I/O request is a read request (Yes), the CPU 103 executes S503, and if the request is not a read request but a write request (No), the CPU 103 executes S504. In S503, the CPU 103 increments the access count value of the chunk via the read request. That is, the CPU 103 adds one to the number of times of read accesses 309 in the used chunk table 30 corresponding to the chunk in the read request.

In S504, the CPU 103 adds the capacity of the write data to the data capacity of a daily counter E (d) (d represents date, which is a natural number of 1 to 30). According to the present embodiment, the day-to-day counter is divided into spaces corresponding to one month (here, the number of spaces is set to 30 for convenience) and stored per day, but the counter can also be divided into spaces corresponding to units of minutes, hours, weeks, or months. For example, it is possible to provide an hour by hour counter corresponding to one month, or 720 hours, according to which the number of spaces will be set to 720.

Then, in S505, the CPU 103 causes an execution pointer of the online verification target area (range) of the write target tier to be offset corresponding to the write capacity. In other words, since the write-completed chunk will be removed from the unused chunk queue table 40, the execution pointer of the online verification will be moved back corresponding to the number of chunks removed from the queue table.

For example, prior to the write operation, there are chunks from #1 to #10 in the unused chunk queue table 40, and it is assumed that the next execution pointer of online verification points to #3. When write processing is performed, it is assumed that two chunks, #1 and #2, are used, and removed from the unused chunk queue table 40, so that the execution pointer must be moved to #3 which is at the beginning of the chunk. Furthermore, if ranges #1 to #5 have been executed via online verification prior to the write processing, the online verification will be performed to the range of #3 to #7 after the write processing.

In S506, the CPU 103 determines whether the process leads to the execution of inter-tier data migration processing or not. If it does (Yes), the CPU 103 executes S507, and if it doesn't (No), the processing is ended.

In S507, the CPU 103 executes inter-tier data migration processing of the migration target chunk. In S508, the CPU 103 adds the increment capacity of data being the target of inter-tier migration from each of daily counters A (d) to D (d). For example, the migration quantity from Tier 1 to Tier 2 (storage capacity of the number of migration chunks) is added as the increment capacity of data to the data capacity of the daily counter A (d).

In S509, the CPU 103 determines whether the migration of all target data has been completed or not. If migration is not completed (No), the CPU 103 re-executes the processes of S507 and thereafter, and if it is completed (Yes), it executes S510. In S510, the CPU 103 executes a write data incremental quantity computation processing for each tier shown in S600 of FIG. 6. In S511, the CPU 103 sets or updates the online verification target area (range) to be executed next, based on the incremental quantity of the write operation for each tier computed in S510.

<Increment Capacity of Write Data>

Figure 6:
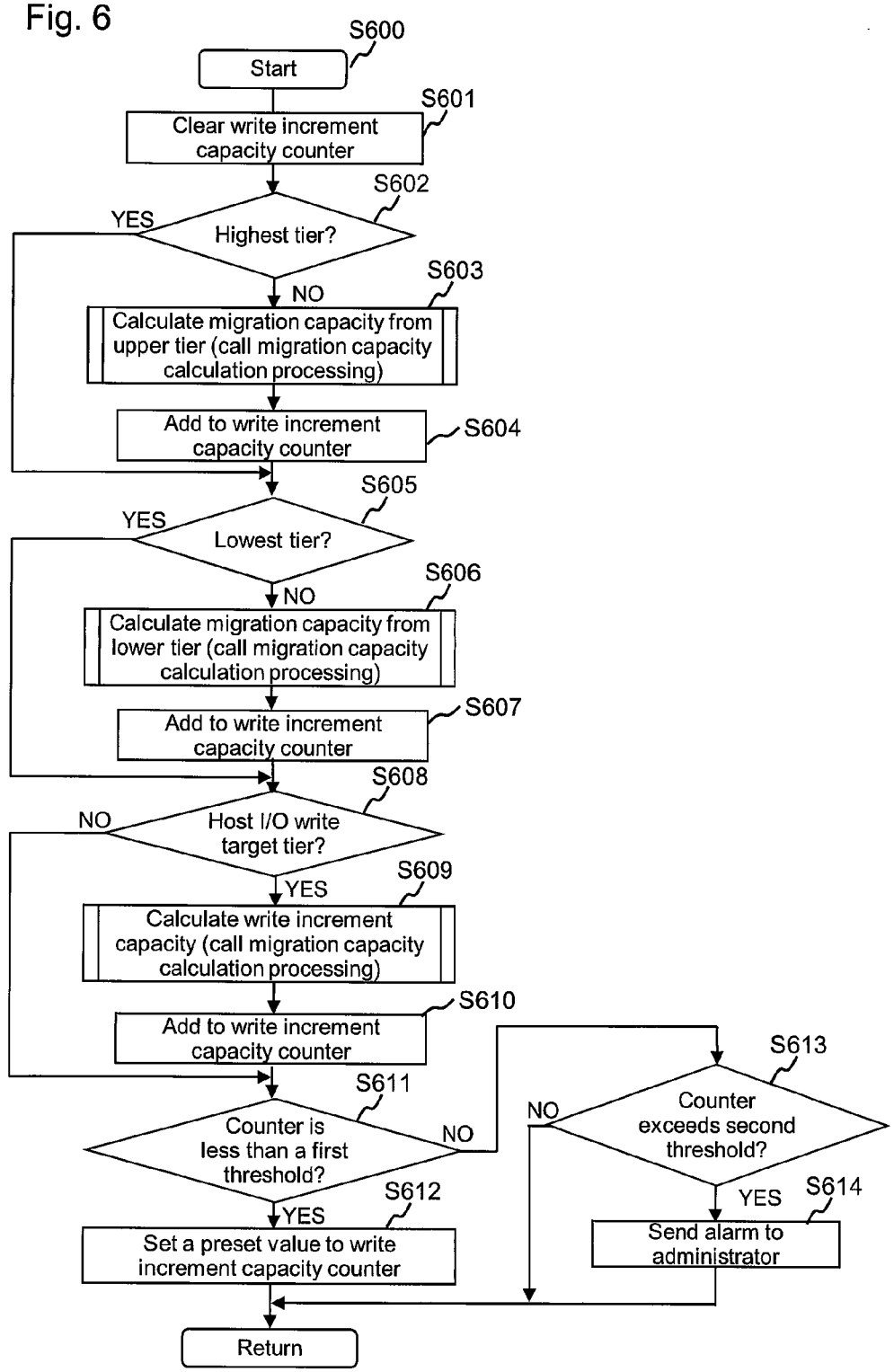
FIG. 6 is a flowchart showing a process for calculating a write increment capacity of each tier.

FIG. 6 is a flowchart showing the process for computing the increment capacity of write data of each tier. The present processing is executed for each tier, so as to compute the increment capacity of write data for each tier. The main subject of the processing is either the data migration control program 113 or the storage media test control program 114, but in the present description, the CPU 103 is described as the subject of processing.

In S601, the CPU 103 clears the write increment capacity counter. In S602, the CPU 103 determines whether the tier of which the write increment capacity is computed is the highest tier or not. If it is the highest tier (Yes), the CPU 103 executes S605, and if not (No), it executes S603. In S603, the CPU 103 calls and executes a migration capacity calculation processing of FIG. 7, and calculates the migration capacity from the upper tier to the lower tier. In S604, the CPU 103 adds the migration capacity calculated in S603 to the write increment capacity counter.

In S605, the CPU 103 determines whether the tier calculating the write increment capacity is a lowest tier or not. If it is the lowest tier (Yes), the CPU 103 executes S608, and if not (No), it executes S606. In S606, the CPU 103 calculates the migration capacity from the lower tier to the upper tier in the migration capacity calculation processing. In S607, the CPU 103 adds the migration capacity calculated in S606 to the write increment capacity counter.

In S608, the CPU 103 determines whether the tier calculating the write increment capacity is a host I/O write target tier or not. If it is a host I/O write target tier (Yes), the CPU 103 executes S609, and if not (No), it executes S611. In S609, the CPU 103 calculates the write increment capacity. In S610, the CPU 103 adds the computed write increment capacity to the write increment capacity counter.

In S611, the CPU 103 determines whether the write increment capacity counter is less than a first threshold or not. The first threshold can be, for example, a simple average value of the past statistical information of the write increment capacity of each tier. If the counter is below the first threshold (Yes), the CPU 103 executes S612, and if not (No), it executes S613. In S612, the CPU 103 sets a preset value to the write increment capacity counter, and sets the value as the lower limit. By setting the lower limit in this manner, online verification processing can be executed in advance without fail for all areas equal to or greater than the data capacity of the storage area considered to be used next. This preset value can be the aforementioned first threshold or a value set in advance.

In S613, the CPU 103 determines whether the write increment capacity counter has exceeded the second threshold or not. This second threshold is a value greater than the first threshold, and for example, it can be the maximum value of the past statistical information of the write increment capacity of each tier. This is to notify that abnormal write increment has occurred. If the second threshold is exceeded (Yes), the CPU 103 executes S614, and if not (No), the procedure is returned to S510. In S614, the CPU 103 sends an alarm to the host computer 2 or the management terminal 3, so as to warn the system administrator.

By executing the above processing for each tier, the write increment capacity for each tier can be calculated.

<Calculation of Migration Capacity>

Figure 7:
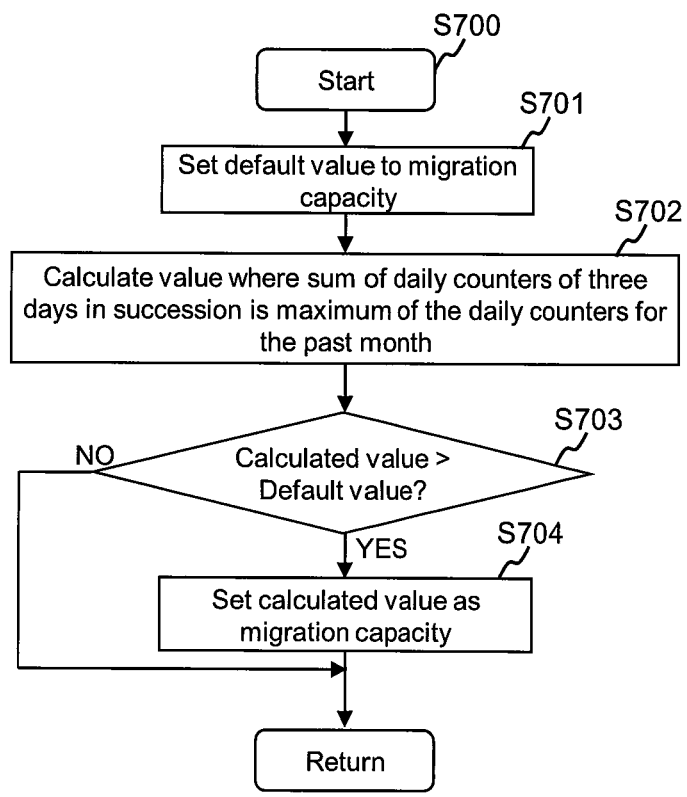
FIG. 7 is a flowchart showing a process for calculating a migration capacity of each tier.

FIG. 7 is a flowchart showing the process for calculating the migration capacity for each tier.

In S701, the CPU 103 sets a default value for migration capacity. During the initial term of introduction of the storage subsystem or the storage tier control function, there is either no or only little statistical information of the migration capacity, so that a default value is set in advance and the migration capacity is controlled so as not to fall below this value. By setting this default value, it becomes possible to prevent the occurrence of a storage area that is not verified during the migration of data to the highest tier or the migration of data to the lowest tier.

It is possible to set up an upper limit threshold and a lower limit threshold to the access frequency (especially the read access), and if the upper limit threshold is exceeded, the default value of the calculation of migration quantity to the upper tier can be corrected, for example, to be increased by 20%. Similarly, if the lower limit threshold is not reached, the default value of the calculation of migration quantity to the lower tier can be corrected to be increased, for example.

Further, since migration tends to occur from the upper tier to the lower tier, the default value of the calculation of migration quantity from the upper tier to the lower tier should preferably be set greater than the default value of the calculation of migration quantity from the lower tier to the upper tier.

In S702, the CPU 103 calculates the value where the sum of daily counters of three days in succession is maximum of the daily counters for the past month (30 counters). In order to calculate the maximum value, instead of using the sum of three days in succession, the sum of 72 hours in succession can be used, or in other examples, five days in succession or a whole week can be used.

In S703, the CPU 103 determines whether the calculated value exceeds a default value set in advance or not. If the calculated value exceeds the default value (Yes), the CPU 103 executes 5704, and if not (No), the present processing is called and the process is returned to the original. In this case, the migration capacity will be the default value. In 5704, the CPU 103 sets the calculated value as the migration capacity. According to the processing described above, it becomes possible to calculate the migration capacity of data during inter-tier migration or by host I/O write processing.

By dividing the write increment capacity of each tier calculated based on the result of processing of FIG. 6 and FIG. 7 by the unit capacity of chunks of each tier, it is possible to determine how many entries starting from the beginning of the unused chunk queue table 40 will be the target of online verification. Prior to executing the next inter-tier data migration processing, online verification processing is executed to the storage area based on the obtained number of chunks.

<Online Verification>

Figure 8:
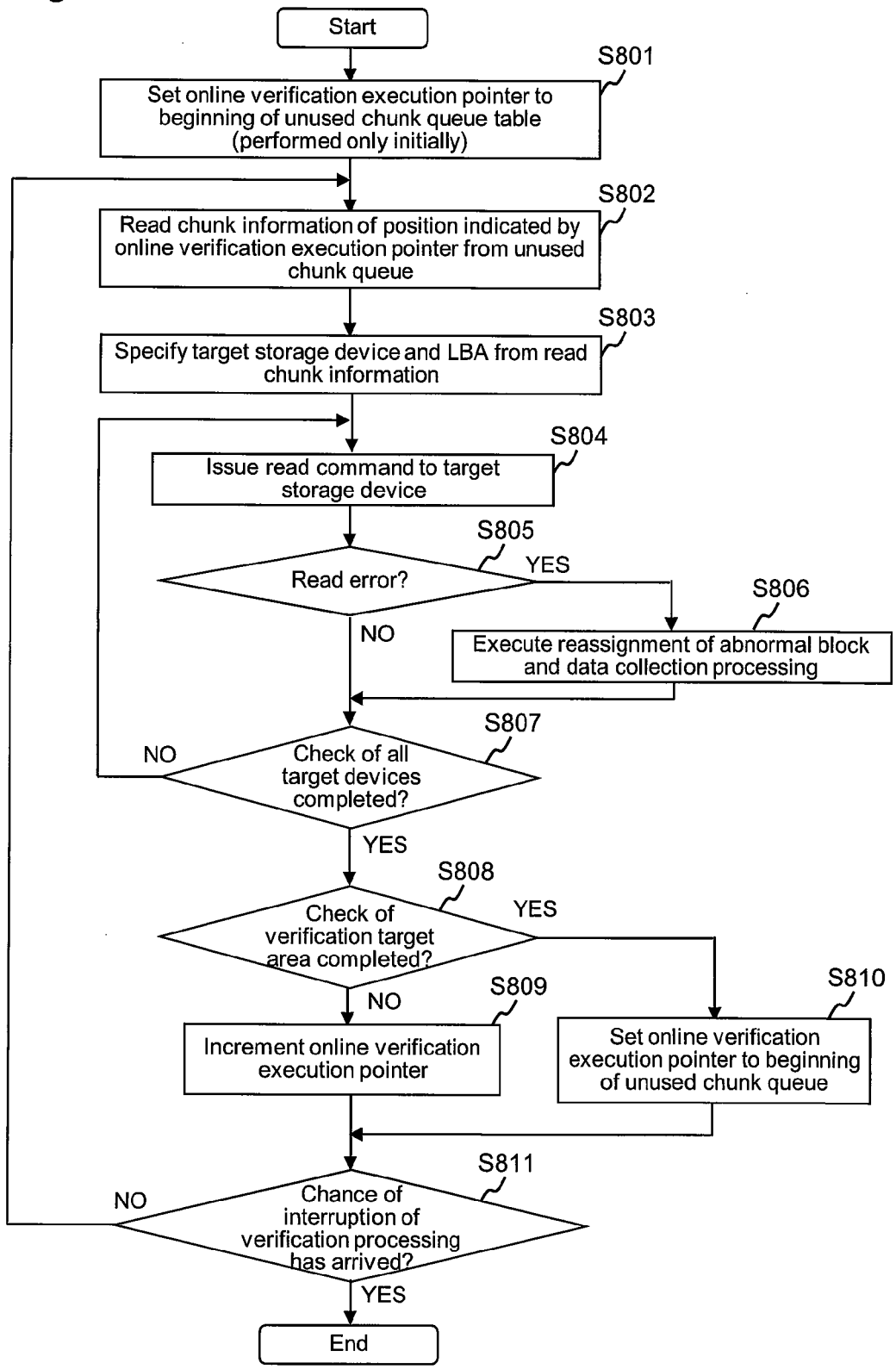
FIG. 8 is a flowchart showing an online verification processing of each tier.

FIG. 8 is a flowchart showing the online verification processing of each tier. For each tier, the present processing will be executed independently from normal online verification processing.

In S801, the CPU 103 sets the online verification execution pointer to the beginning of the unused chunk queue table 40. This process is performed only initially, and it is not required to be executed for the subsequent processes.

In S802, the CPU 103 reads the chunk information of the position indicated by the online verification execution pointer from the unused chunk queue table 40. In S803, the CPU 103 specifies an RG number and a start LBA of the target storage device based on the read chunk information.

In S804, the CPU 103 issues a read command for each storage device constituting the specified RG. In S805, the CPU 103 determines whether a read error has occurred or not. If an error has occurred (Yes), the CPU 103 executes S806, and if not (No), CPU 103 executes S807. In S806, the CPU 103 executes a reassignment processing in which the abnormal block (LBA) where error has occurred is replaced with a replacement block, and executes a data collection processing for the replacement block. Since it is an unused storage area, a write-read check can be issued or a verification command can be issued to each storage device.

In S807, the CPU 103 determines whether the check of all storage devices being the target of verification has been completed or not. If it is not completed (No), the CPU 103 re-executes the process starting from S804.

In S808, the CPU 103 determines whether the check of the verification target area has been completed or not. In other words, it is determined whether online verification processing has been executed for all storage areas corresponding to the number of chunks obtained by dividing the write increment capacity of each tier computed by the processing result of FIGS. 6 and 7 by the unit capacity of chunks of each tier. If the check is not completed (No), the CPU 103 increments the online verification execution pointer in S809. If the check is completed (Yes), the CPU 103 sets the online verification execution pointer to the beginning of the unused chuck queue in S810.

Lastly, in S811, the CPU 103 determines whether the chance of interruption of verification processing has arrived, and if it is not an interruption chance (No), the processing of S802 will be executed again, and if it is an interruption chance (Yes), the online verification processing will be ended.

The chance of execution of online verification can be any arbitrary chance, such as when the host I/O has ended and a given time has elapsed, or when the status of load of the host I/O has fallen below a threshold. In another example, the verification can be started at a time set via a timer or the like. The chance of interruption or ending of the verification can also be any arbitrary chance, such as when the status of load of the host I/O has exceeded a threshold or when a host I/O is received, for example. The next online verification processing can be resumed from the interrupted point.

As described, according to the present invention, online verification processing is performed independently from a normal online verification processing, limited to the storage area having been assumed to be used next. Therefore, the number of times of the check performed per chunk can be increased compared to the prior art, and the reliability of the storage area can be improved even further.

The present invention is not restricted to the above-illustrated preferred embodiments, and can include various modifications. The above-illustrated embodiments are mere examples for illustrating the present invention in detail, and they are not intended to restrict the present invention to include all the components illustrated above. Further, a portion of the configuration of an embodiment can be replaced with the configuration of another embodiment, or the configuration of a certain embodiment can be added to the configuration of another embodiment. Moreover, a portion of the configuration of each embodiment can be added to, deleted from, or replaced with other configurations.

Furthermore, a portion or whole of the above-illustrated configurations, functions, processing units, processing means and so on can be realized via a hardware configuration, such as by designing an integrated circuit. Further, the configurations and functions illustrated above can be realized via software, by the processor interpreting and executing programs realizing the respective functions.

The information such as the programs, tables and files for realizing the respective functions can be stored in a storage device such as a memory, a hard disk or a SSD (Solid State Drive), or in a memory media such as an IC card, an SD card or a DVD.

Further, only the control lines and information lines considered necessary for description are illustrated in the drawings, and not necessarily all the control lines and information lines required for production are illustrated. In actual application, almost all the configurations are mutually coupled.

REFERENCE SIGNS LIST

1 Storage subsystem
2 Host computer
30 Used chunk table
40 Unused chunk queue table
100 Storage Controller 103 CPU
112 Access frequency measurement program
113 Data migration control program
114 Storage media test control program
200 Storage unit
221 Tier 1 (SSD)
222 Tier 2 (SAS)
223 Tier 3 (NL-SAS)

The invention claimed is:

1. A storage subsystem coupled to a host computer, comprising:
a plurality of storage devices for storing data sent from the host computer;
a processor for managing a storage area of the storage devices; and
a memory for storing management information of the storage area,
wherein the processor is programmed to:
perform tiering of the plurality of storage devices;
manage each tier subjected to tiering by providing a priority order based on a performance or a property of each of the plurality of storage devices;
manage an access frequency which is a number of accesses per unit time of data in the plurality of storage devices per tier;
extracts data being a candidate of migration by referring to the access frequency per tier, and migrate the data to a higher tier having a higher priority or to a lower tier having a lower priority than the tier in which said data is stored;
calculate an increment capacity of write data being written to the tier within a predetermined period of time per tier; and
execute a verification processing of detecting and restoring a defect of a storage media of the plurality of storage devices regarding the storage area of each tier corresponding to the calculated data increment capacity before using said storage area,
wherein the increment capacity of write data is either any one of the following, or a total of two or more of the following:
(d1) a capacity of data written via migration from the higher tier;
(d2) a capacity of data written via migration from the lower tier; or
(d3) a capacity of data written from the host computer,
wherein each of the capacity of data of (d1) through (d3) is calculated so that a total value of a predetermined period of time determined in advance based on an actual value per predetermined time unit becomes maximum, and
wherein the predetermined unit time is any one of the following units: per minute, per hour, per day, per week, or per month.

2. The storage subsystem according to claim 1, wherein
if each of the calculated capacity of data is smaller than a default value respectively determined in advance, the capacity of data is set as the default value; and
if the calculated capacity of data is greater than the default value, the capacity of data is set as the calculated value;
wherein a default value for calculating (d1) is greater than a default value for calculating (d2).

3. The storage subsystem according to claim 2, wherein
if the increment capacity of write data is smaller than a first threshold value determined in advance, the increment capacity of write data is set as a preset value determined in advance; and
if the increment capacity of write data is greater than the first threshold value, the increment capacity of write data is set as a calculated value.

4. The storage subsystem according to claim 3, wherein the preset value is the first threshold value.

5. The storage subsystem according to claim 3, wherein
a management terminal is coupled to the storage subsystem; and
if the capacity of data being migrated to the calculated tier exceeds a second threshold value determined in advance which is greater than the first threshold value, a warning is notified to the host computer or the management terminal.

6. The storage subsystem according to claim 5, wherein
an upper limit threshold and a lower limit threshold of an access frequency per tier are determined in advance;
wherein if migration to a higher tier occurs at an access frequency equal to or greater than the upper limit threshold, a correction is performed to add a first predetermined capacity of data to the calculated capacity of data (d1); and
if migration to a lower tier occurs at an access frequency below the lower limit threshold, a correction is performed to add a second predetermined capacity of data to the calculated capacity of data (d2).

7. A method for verifying storage area of a storage subsystem coupled to a host computer, the storage subsystem comprising:
a plurality of storage devices for storing data sent from the host computer, a processor for managing a storage area of the storage devices, and a memory for storing management information of the storage area;
the method comprising:
performing tiering of the plurality of storage devices;
managing each tier subjected to tiering by providing a priority order based on a performance or a property of each of the plurality of storage devices;
managing an access frequency per tier of data in the plurality of storage devices;
extracting data being a candidate of migration by referring to the access frequency per tier, and migrating the data to a higher tier having a higher priority or to a lower tier having a lower priority than the tier in which said data is stored;
calculating a data capacity being migrated to the tier within a predetermined period of time per tier; and
executing a verification processing of detecting and restoring a defect of a storage media of the plurality of storage devices regarding the storage area of each tier corresponding to the calculated maximum value of data capacity before using said storage area,
wherein the increment capacity of write data is either any one of the following, or a total of two or more of the following:
(d1) a capacity of data written via migration from the higher tier;
(d2) a capacity of data written via migration from the lower tier; or
(d3) a capacity of data written from the host computer,
wherein each of the capacity of data of (d1) through (d3) is calculated so that a total value of a predetermined period of time determined in advance based on an actual value per predetermined time unit becomes maximum, and
wherein the predetermined unit time is any one of the following units: per minute, per hour, per day, per week, or per month.

8. The method for verifying storage area according to claim 7, wherein
if each of the calculated capacity of data is smaller than a default value respectively determined in advance, the capacity of data is set as the default value; and
if the calculated capacity of data is greater than the default value, the capacity of data is set as the calculated value;
wherein a default value for calculating (d1) is greater than a default value for calculating (d2).

9. The method for verifying storage area according to claim 8, wherein
if the increment capacity of write data is smaller than a first threshold value determined in advance, the increment capacity of write data is set as a preset value determined in advance; and
if the increment capacity of write data is greater than the first threshold value, the increment capacity of write data is set as a calculated value.

\* \* \* \* \*